United States Patent
Banh et al.

(10) Patent No.: US 6,526,294 B1
(45) Date of Patent: Feb. 25, 2003

(54) AUTOMATIC CONTROL CIRCUIT FOR ENABLING AND DISABLING THE SUPPLY VOLTAGE IN A SHORT RANGE WIRELESS DEVICE

(75) Inventors: An Tuyen Banh, Apex, NC (US); Jiemei Jiao, Morrisville, NC (US), .

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/392,989

(22) Filed: Sep. 9, 1999

(51) Int. Cl.[7] .............................. H04B 1/38; H04B 1/16; H02J 7/00
(52) U.S. Cl. .................. 455/573; 455/343; 455/572; 455/574; 455/575; 320/112; 320/114; 320/115
(58) Field of Search .................. 320/112, 114, 320/115; 455/572, 573, 574, 575, 343, 127

(56) References Cited

U.S. PATENT DOCUMENTS

| | | | |
|---|---|---|---|
| 4,297,629 A | * 10/1981 | Godard et al. ................ 320/7 |
| 4,709,201 A | * 11/1987 | Schaefer et al. ............... 320/2 |
| 4,862,310 A | * 8/1989 | Harrington, III ............. 361/58 |
| 5,218,285 A | * 6/1993 | Carlton et al. ................ 320/15 |
| 5,590,417 A | 12/1996 | Rydbeckr .................... 455/351 |
| 5,596,626 A | 1/1997 | Nakayama ................... 379/61 |
| 5,754,027 A | * 5/1998 | Oglesbee et al. .............. 320/5 |
| 5,793,186 A | * 8/1998 | Watabe et al. ............... 320/112 |
| 5,794,163 A | 8/1998 | Paterson et al. ............. 455/568 |
| 6,031,353 A | * 2/2000 | Banyas et al. ............... 320/112 |
| 6,054,814 A | * 4/2000 | Constable ................... 315/241 |

* cited by examiner

Primary Examiner—Edward F. Urban
Assistant Examiner—Meless Zewdu
(74) Attorney, Agent, or Firm—Coats & Bennett, P.L.L.C.

(57) ABSTRACT

A power control circuit for a short-range wireless device includes a diode positioned between the negative terminal of a battery and an external connector to force a logical LOW when the battery is recharging and a logical HIGH when the battery is in use by the voltage regulator of the device.

7 Claims, 6 Drawing Sheets

AUTOMATIC CONTROL CIRCUIT FOR ENABLING AND DISABLING THE SUPPLY VOLTAGE IN A SHORT RANGE WIRELESS DEVICE

FIELD OF THE INVENTION

The present invention pertains to a simplified circuit that facilitates charging or recharging of a battery for use in a short-range wireless device such as an earpiece assembly or handset.

BACKGROUND OF THE INVENTION

Many portable electronic devices are configured to include a remote unit, which cooperates with a base unit. Examples include AM/FM radios, portable compact disc players, cellular telephones, and the like. The remote unit typically includes at least a speaker for broadcasting an audio signal to the user/listener, and may include a microphone for translating a voice signal from the user prior to transmission to the base unit.

While in the past it has been commonplace for these remote units to be attached to the base unit via a cord, consumers are more frequently demanding that these remote units be wireless. This is due in part to the fact that consumers do not want wires dangling from a headset or across a windshield. Manufacturers are also willing to go wireless because it eliminates a component that may be easily damaged during use. Another place the wire may get damaged is prior to storage when the user winds the wire around the remote unit to make the wire and remote unit combination as small as possible. This winding is common since few remote units include mechanisms for cord retraction.

As a result of this demand, wireless remote units are becoming increasingly common, especially in the cellular phone industry, where hands free units that communicate with the cellular phone may include a visor mounted microphone and speaker, earpiece assemblies or other headset type remote units. These wireless units typically have a transceiver, which communicates with the base unit over an RF channel. These wireless units are designed to operate at short-ranges for this communication. Short-range as used herein means less than approximately 2–3 meters. Inherently, short-range wireless communication devices must be powered by batteries, which are typically rechargeable.

In contrast to some devices, these short-range wireless communication devices are typically charged or recharged by selective mounting on the base unit, which itself may be battery powered. In such cases, a problem arises when the base unit's power source is used to charge the battery of the remote unit. Absent a power control circuit, the remote unit continues to use power, even when recharging. Thus, there is a need to disable the wireless device during recharging so as not to drain the battery in the base unit.

The prior art provides several methods to perform this disabling function, including a manual switch, a separate connector which grounds the remote device during charging, or a logic circuit which detects recharging. All of these solutions have drawbacks. Namely, the user may forget to flip the switch; the separate connector requires additional hardware; and the logic circuit is space consumptive and expensive. Thus, there remains the need for a circuit which disables a voltage regulator in short-range wireless devices, especially a handset or earpiece.

SUMMARY OF THE INVENTION

The present invention relates to a charging circuit that overcomes some of the disadvantages of the prior art charging circuits. The circuit may be used, for example, in a headset that is charged by the battery in a wireless telephone. The circuit includes a diode, which acts as a switch to selectively change the state of the $V_{control}$ port of a voltage regulator in the handset. When the short-range wireless device is plugged into the charging unit, the diode is forward biased and $V_{control}$ is effectively grounded, or forced to state a logical LOW level. This disables the regulator, allowing the battery to charge without any unnecessary drain on the charging source from the voltage regulator. When the wireless device is unplugged, the diode becomes reverse biased, effectively acting as an open circuit, which forces the $V_{control}$ to a logical HIGH state, thereby enabling the regulator for normal operation. This circuit eliminates numerous elements from the circuits of the prior art and allows a simple, reliable, economical structure to be incorporated into the device to ensure proper recharging.

DETAILED DESCRIPTION OF THE PREFERRED EMBODIMENT

Figure 1:
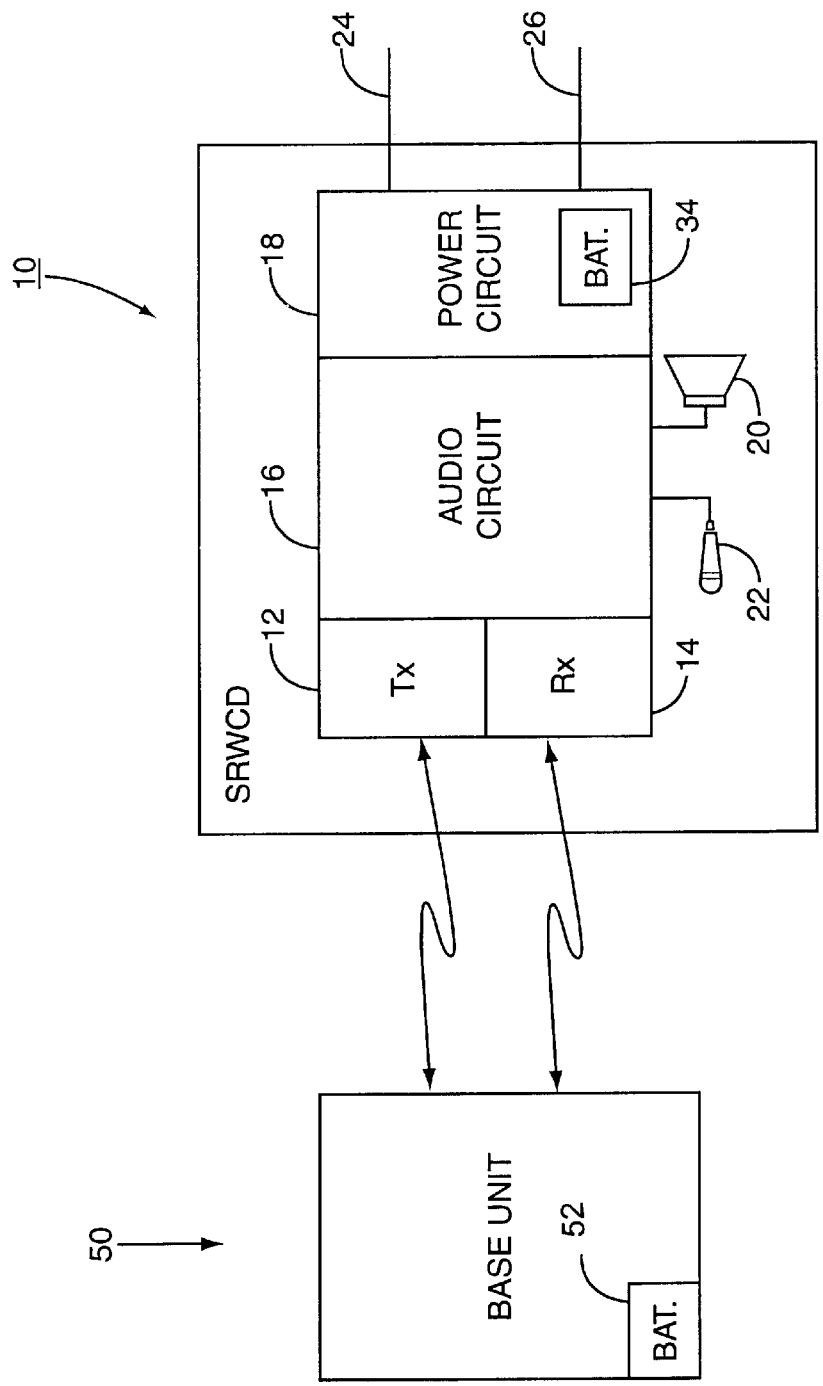
FIG. 1 pictures a block diagram of a short-range wireless device with its associated base unit.

Turning now to the drawings, FIG. 1 shows a short-range wireless communication device (SRWCD) 10, which operates in conjunction with a base unit 50. The SRWCD 10 may, for example, be an earpiece assembly, a wireless handset, a cellular phone hands free unit or the like used in conjunction with a cellular telephone. The base unit 50 includes a voltage source or battery 52. The SRWCD 10 includes a transmitter 12 and a receiver 14 for communicating with the base unit 50. An audio circuit 16 processes audio signals received from the base unit 50 or input via a microphone 22 and outputs the audio signals to the transmitter 12 or a speaker 20. Power for the SRWCD 10 is supplied by a power circuit 18 and battery 34. Power circuit 18 has two connectors 24 and 26, which mate with corresponding contacts on the base unit 50 to recharge the battery 34.

Figure 4:
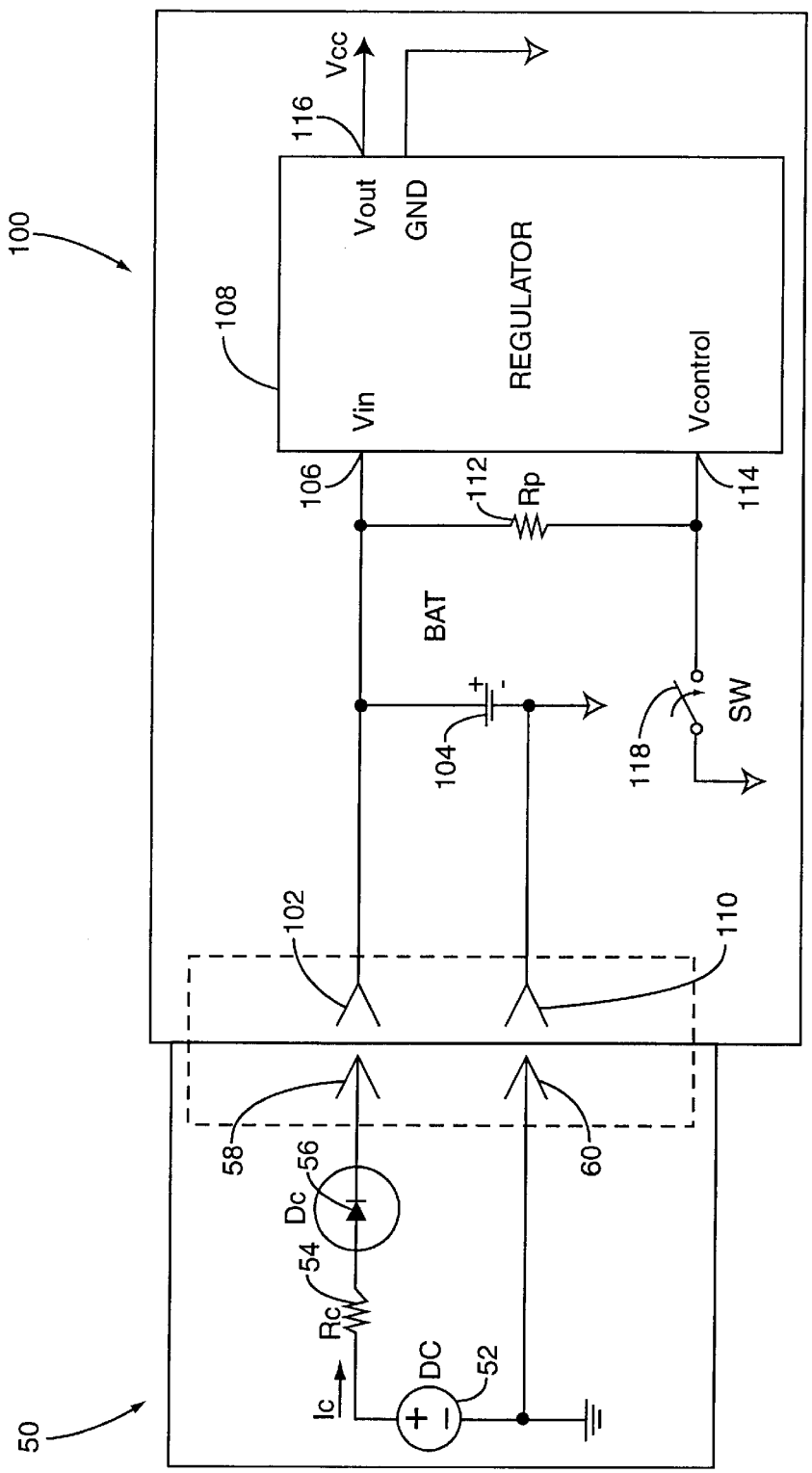
FIG. 4 is a schematic diagram of a prior art charging circuit with a manual switch.

It is known in the prior art to provide short-range wireless devices with power control circuitry to allow efficient recharging. However, these prior art power control circuits were expensive, unwieldy and included extra elements. One example of a prior art power control circuit is seen in FIG. 4, wherein a manual switch is used to control the power circuit 18. A base unit 50 is a battery recharging device which includes a battery or voltage source 52, a resistor 54 and a diode 56. Base unit 50 also includes a first connector 58 to supply current $I_c$ to the SRWCD 10 and a second connector 60 connected to a ground.

Connected to the base unit 50 is a short-range wireless device 100, such as a handset or earpiece assembly. The device 100 includes a first connector 102 that provides current $I_c$ to the positive terminal of a battery 104 as well as to the $V_{in}$ port 106 of a voltage regulator 108. The negative terminal of the battery 104 is connected to an internal ground and to a second connector 110. A resistor 112 is positioned across the $V_{in}$ port 106 and the $V_{control}$ port 114 of the regulator 108. A switch 118 selectively connects the $V_{control}$ port 114 to ground. The switch 118 is a manual switch, such as a simple toggle, and is located on the outside of the device 100 so that the user may toggle the switch 118.

The regulator 108 provides power to the speaker 20 and microphone 22 as well as the wireless transceiver (not shown) of the handset or earpiece assembly as needed through the $V_{out}$ port 116. The regulator 108 operates or consumes power when $V_{control}$ 114 is at a logical HIGH and is inoperative or does not consume power when $V_{control}$ 114 is at a logical LOW. Thus, during recharging, the user is supposed to close the switch 118 when the device 100 is recharging. This grounds $V_{control}$, forcing it to a logical LOW. The regulator 108 becomes inoperative, and all $I_c$ flowing into the device 100 is used to charge the battery 104. No additional drain is put on the voltage source 52 by the voltage regulator 108.

When the device 100 is not charging, the switch 118 is opened, raising $V_{control}$ to a logical HIGH and permitting the operation of the regulator 108. This solution requires the addition of a manual on/off switch, which adds to the cost and size of the device 100. Additionally, the user may forget to use the switch 118 as required, resulting in unnecessary drain on the voltage source 52.

Figure 5:
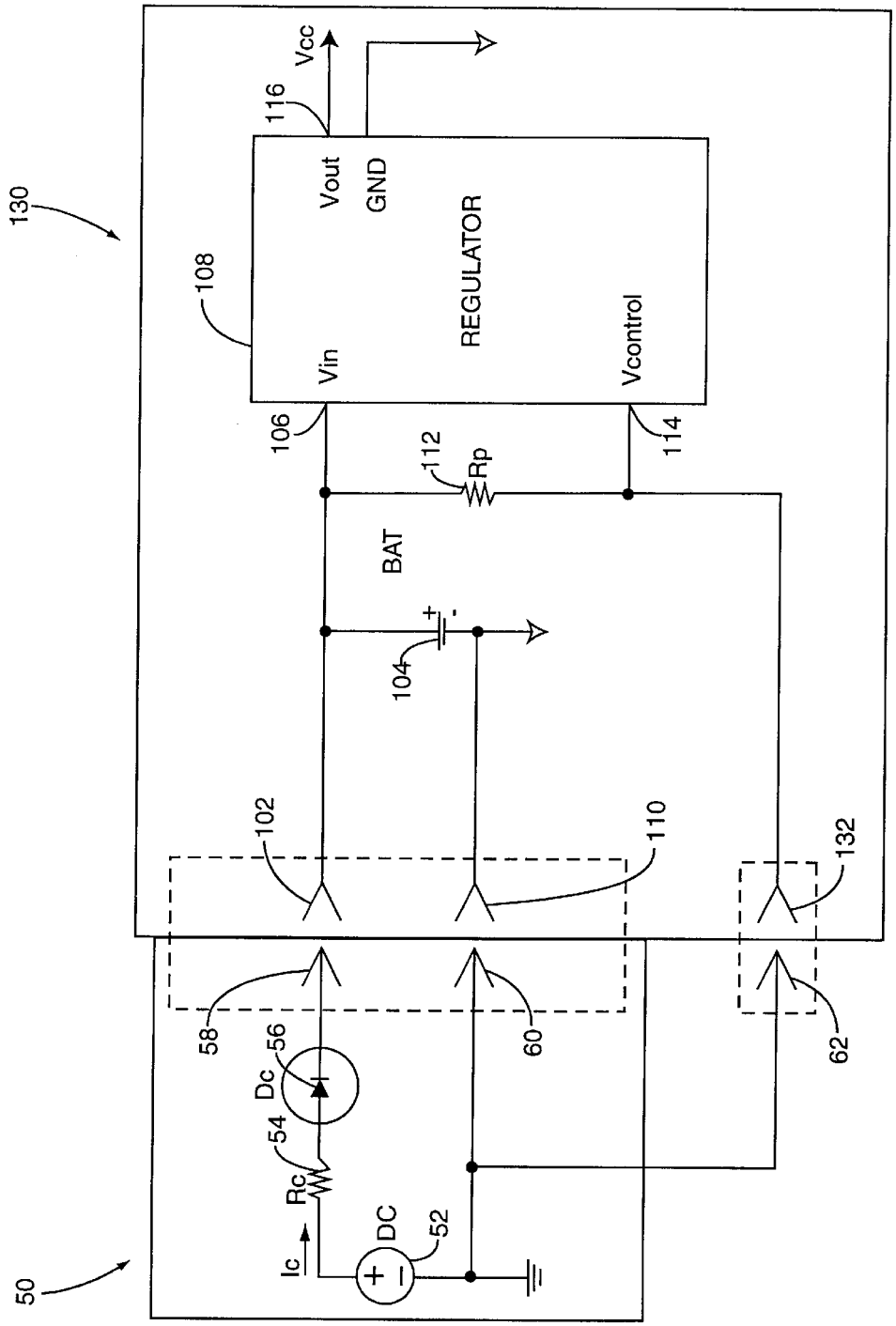
FIG. 5 is a schematic diagram of a second prior art charging circuit with an additional contact.

A second approach to solving the problem is seen in FIG. 5, wherein an additional connector 132 is used to control the voltage regulator 108. In this embodiment, the base unit 50 includes a third connector 62 which is operatively connected to the ground of the base unit 50. The device 130 is similar to device 100 with the exception of the switch 118. The device 130 further includes a third connector 132 which is operatively connected to the $V_{control}$ port 114 and mates with the third connector 62 of the base unit 50.

As would be expected, when the device 130 mates with the base unit 50, the connectors come into mutual contact. Connector 62 mates with connector 132, effectively grounding the $V_{control}$ port 114 and disabling the regulator 108. The battery 104 charges normally until the device 130 is unplugged from the base unit 50. When the device 130 is unplugged, $V_{control}$ 114 is no longer grounded and changes to logical HIGH. The device 130 then operates as normal.

The problem with this solution is the addition of a third connector which takes up space and increases the cost of the device 130. On the base unit 50 side, a valuable connector 62 is used which could be used to control another accessory (not shown), or a dedicated connector 62 must be installed, increasing the cost of the base unit 50.

Figure 6:
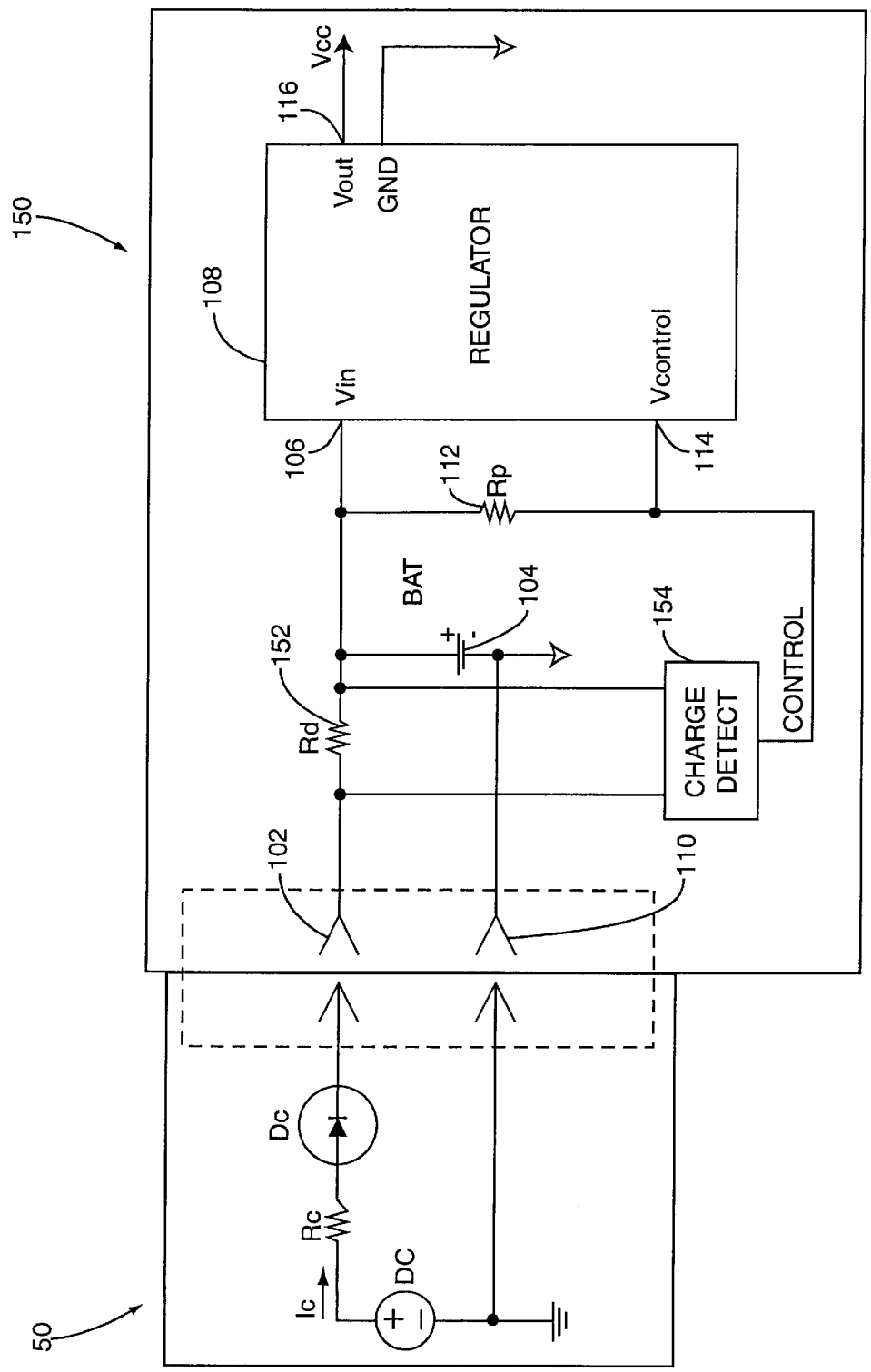
FIG. 6 is a schematic diagram of a third prior art charging circuit with a logic circuit.

A third solution is seen in FIG. 6, wherein a logic circuit is used to control the voltage regulator. Base unit 50 is identical to that disclosed in FIG. 4 above. The device 150 includes a first connector 102 which supplies current $I_c$ to the battery 104. However, interposed between the connector 102 and the battery 104 is a resistor 152. A conventional charge detect circuit 154 is positioned in parallel with the resistor 152 and detects whether current is flowing across the resistor 152. If current is flowing across the resistor 152, indicating that the device 150 is plugged into the base unit 50, the charge detect circuit 154 forces $V_{control}$ to a logical LOW, disabling the regulator 108. If no current flows across the resistor 152, indicating an operative, or not charging state, then the charge detect circuit 154 forces $V_{control}$ to a logical HIGH, thereby enabling the regulator 108.

The problem with this solution is the expense and size associated with the charge detect circuit 154, since at a minimum, a charge detect circuit must include a resistor, a comparator and a reference voltage. Thus, none of the known solutions are completely satisfactory.

Figure 2:
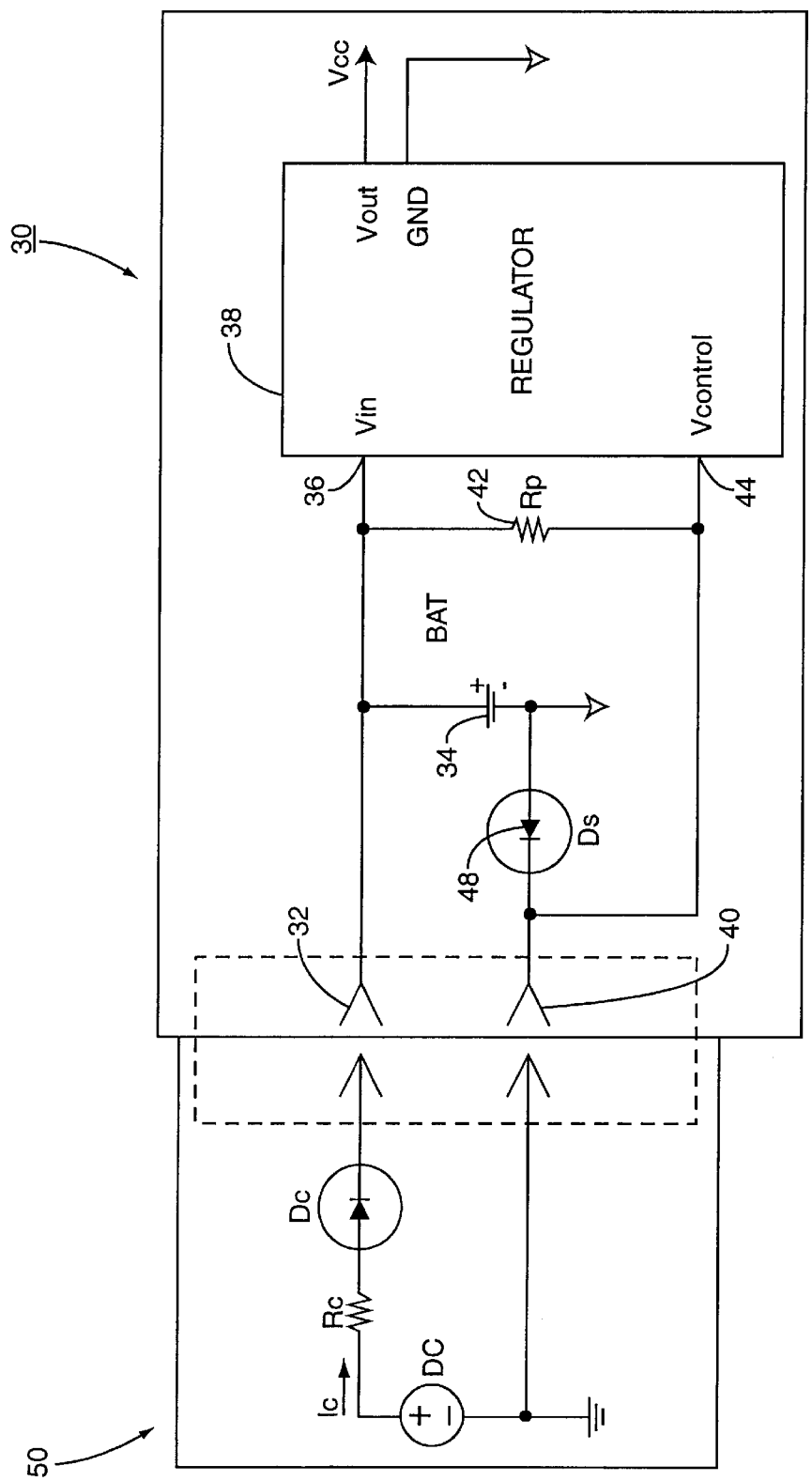
FIG. 2 is a schematic diagram of the charging circuit of the present invention.

The present invention performs the same function as those described above, but at a fraction of the cost and with minimal size requirements. Turning now to FIG. 2, the preferred embodiment of the device 30 is shown coupled to a base unit 50 such as previously described. The device 30 includes a first connector 32 providing a first electrical path to the $V_{in}$ port 36 of a voltage regulator 38, the positive terminal of the battery 34, and one end of the resistor 42. The resistor 42 bridges the $V_{in}$ port 36 and $V_{control}$ port 44 and is also connected to the second connector 40. Interposed between the second connector 40 and the negative terminal of the battery 34 is a switching element, such as a diode 48.

When the device 30 is disconnected from the base unit 50, the diode 48 will be reverse biased, or effectively an open circuit. The resistance of the diode 48 will be much greater than the resistance of the resistor 42. As a result, $V_{control}$ port 44 will be at a logical HIGH state and the voltage regulator 38 will be enabled. When the wireless device 30 is connected to the base unit 50 for charging battery 34, the diode 48 will be forward biased. In this configuration, most of the current $I_c$ will flow through the battery for charging. The $V_{control}$ port 44 will be equal to the voltage drop across the diode 48, typically about 0.7 V, effectively grounded, or at least a logical LOW state and the voltage regulator 38 will be disabled.

This arrangement ensures that the voltage regulator 38 is disabled during charging of the battery 34 so as to prevent unnecessary drain on the voltage source 52 of the base unit 50, which, as noted above, is frequently a cellular phone battery or similar battery. However, when charging is completed and the handset or earpiece is disconnected from the base unit 50, the voltage regulator 38 is immediately activated, allowing immediate use by the user without the need for a manual switch or the like.

Figure 3:
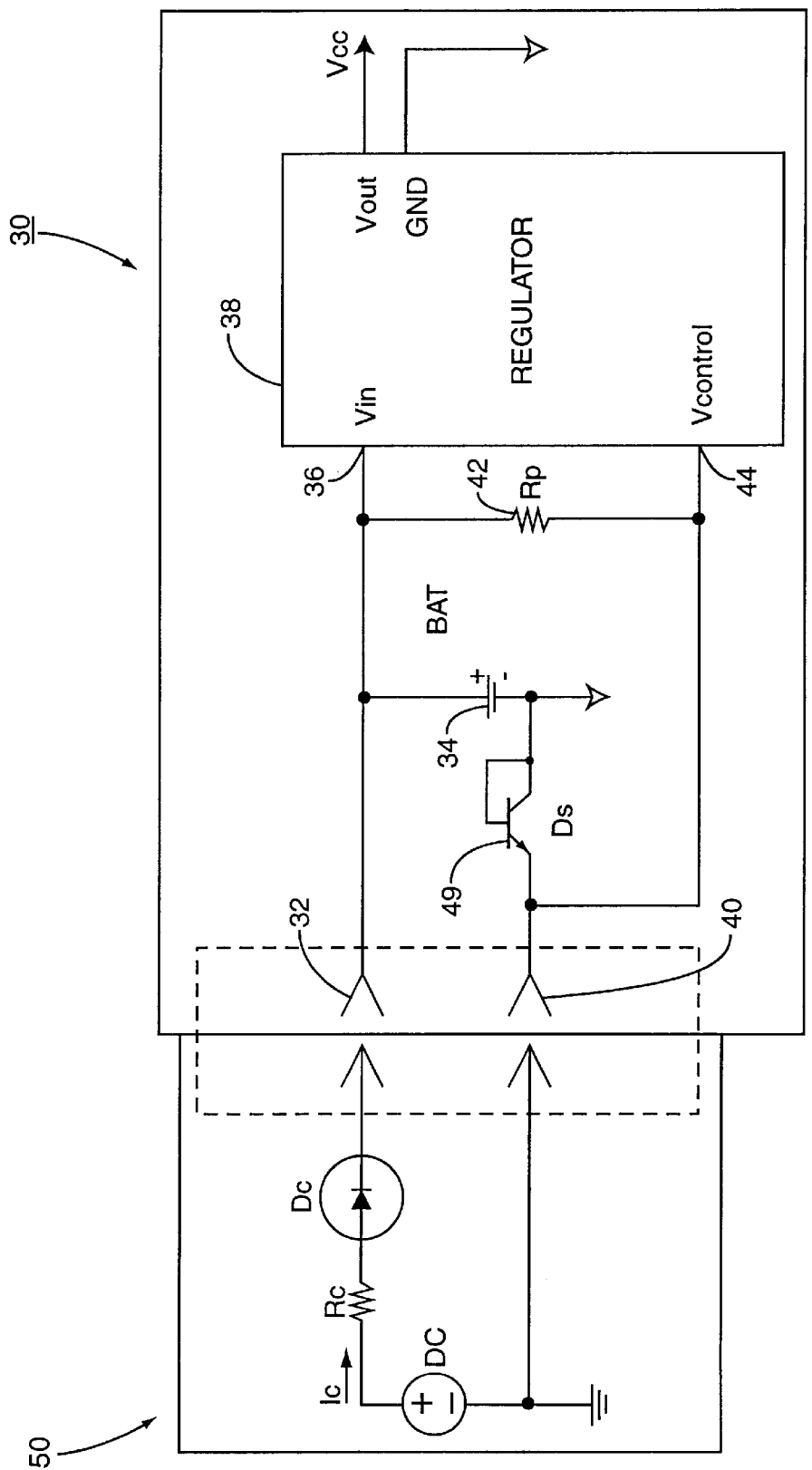
FIG. 3 is a schematic diagram of an alternate embodiment of the charging circuit.

An alternate embodiment is seen in FIG. 3, wherein the diode 48 has been replaced with an n-p-n transistor 49. The transistor 49 also acts as a switching element, with the base and collector tied together to form the anode and the emitter used as the cathode.

The present invention thus eliminates the extra parts required by the prior art solutions as well as conserving space by the addition of a simple diode. The manual switch is eliminated, eliminating the human error involved therewith. The extra connector is eliminated saving space and cost and in general providing for an efficient handset or earpiece.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A power circuit comprising:
   a voltage regulator having a voltage input, a voltage output, and a control input;
   a battery having a positive terminal connected to said voltage input and a negative terminal connected to a ground;

a pull-up resistor connected between said voltage input and said control input;

first and second terminals connected respectively to said positive and negative terminals of said battery for connecting said battery to an external power supply for recharging; and a switching element having a forward biased state and a reverse biased state connected between said second contact and said negative terminal of said battery, wherein said switching element is forward biased when said circuit is connected to said external power supply to allow recharging of said battery and disable said voltage output and is reverse biased when said circuit is disconnected from said external power supply.

2. The power circuit of claim 1 wherein said switching element is a diode.

3. The power circuit of claim 1 wherein said switching element is a transistor.

4. A wireless handset comprising:

a wireless receiver;

a speaker operatively connected to said wireless receiver;

a power circuit for supplying power to said wireless receiver said power circuit comprising:

a voltage regulator having a voltage input, a voltage output, and a control input;

a battery having a positive terminal connected to said voltage input and a negative terminal connected to a ground;

a pull-up resistor connected between said voltage input and said control input;

first and second terminals connected respectively to said positive and negative terminals of said battery for connecting said battery to an external power supply for recharging; and a switching element having a forward biased state and a reverse biased state connected between said second contact and said negative terminal of said battery, wherein said switching element is forward biased when said circuit is connected to said external power supply to allow recharging of said battery and disable said voltage output and is reverse biased when said circuit is disconnected from said external power supply.

5. The wireless handset of claim 4 wherein said switching element is a diode.

6. The wireless handset of claim 4 wherein said switching element is a transistor.

7. The wireless handset of claim 4 further including a wireless transmitter and a microphone operatively connected said wireless transmitter.

* * * * *